E. E. Clarke,
Water Closet.
N°. 50,654. Patented Oct. 24, 1865.
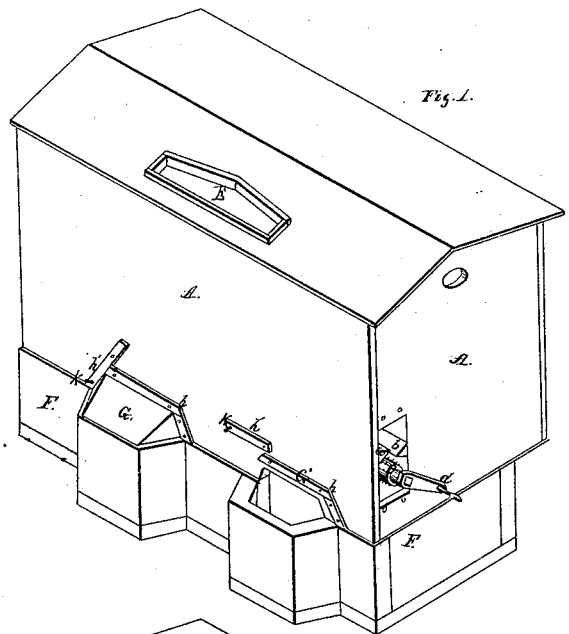
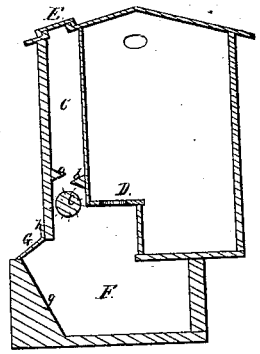
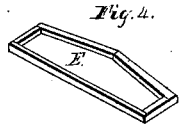
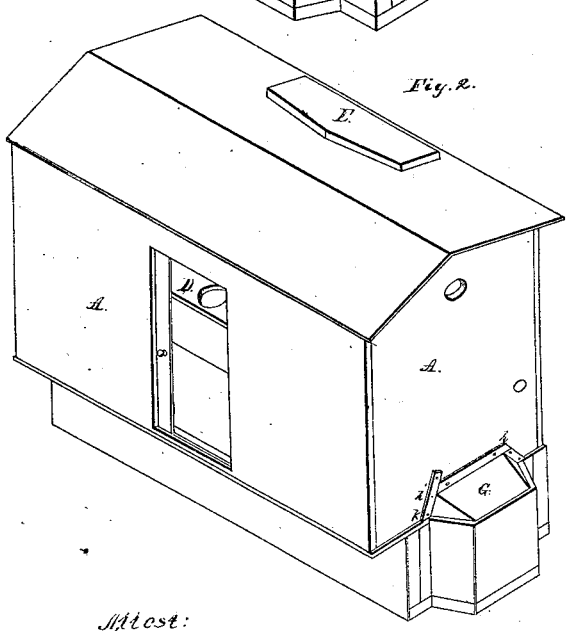
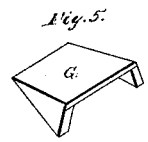
Attest: Inventor:
Elijah E. Clarke

UNITED STATES PATENT OFFICE.

ELIZUR E. CLARKE, OF NEW HAVEN, CONNECTICUT, ASSIGNOR TO FRANKN. N. CLARKE, OF SAME PLACE.

IMPROVEMENT IN THE CONSTRUCTION OF PRIVIES.

Specification forming part of Letters Patent No. 50,654, dated October 24, 1865; antedated October 13, 1865.

*To all whom it may concern:*

Be it known that I, ELIZUR E. CLARKE, of the city and county of New Haven, and State of Connecticut, have invented a new and useful Improvement in the Construction and Arrangement of Outhouses or Privies; and I do hereby declare that the following is a full, clear, and exact description of the construction, character, and operation of the same, reference being had to the accompanying drawings, which make part of this specification, in which—

Figure 1 is a perspective view of the structure, taken from the left-hand rear corner, showing the places for removing the night-soil or contents of the vault, the aperture for receiving the dry muck, &c., into the rear chamber or reservoir, and the admitting and pulverizing apparatus. Fig. 2 is a perspective view of the same, taken from the right-hand front corner, showing the entrance, seat, &c. Fig. 3 is a section of the same, cut from front to rear, showing the relative positions of the several parts. Fig. 4 is a perspective view of the cap or cover for the aperture in the roof. Fig. 5 is a perspective view of one of the covers of the apertures for removing the night-soil, &c.

My improvement consists in so constructing and arranging the several parts of the ordinary out-house or privy that, by the introduction of dry muck or any other suitable absorbent and disinfectant, the night-soil will be readily and continually deodorized and rendered pulverulent and fit to be removed at any and all times without any inconvenience or disagreeable odor, and be suitable to be applied as a fertilizer, wherever desired; and in providing a method of pulverizing the muck, &c., on its downward passage, and of allowing at all times the desired quantity to fall into the vault to absorb the moisture and deodorize the night-soil, &c.; and in constructing the house with a back chamber or reservoir suited to receive and store or preserve in a dry condition the muck, &c., and connected at the bottom through a suitable space, as hereinafter described, with the vault below; and in constructing it with a water-tight vault, so that none of the moisture which falls or is deposited therein can escape to corrupt or otherwise affect the water of the neighboring wells, &c., but all will be absorbed by the muck, &c., to increase its value as a fertilizer.

I build the house or privy A A of wood or any other suitable material, with the seat D, &c., all in the usual way, as represented in Figs. 1 and 2, and throughout the whole (or any desired portion) of the length, back of and parallel to the seat, I construct a chamber or reservoir, as shown in cross-section $a$ C, Fig. 3. Into this chamber or reservoir C, I throw dry muck or any other suitably absorbing and disinfecting substance through the aperture shown at E, Fig. 1, and indicated at E, Figs. 2 and 3, (or otherwise,) where it may be stored and preserved in a dry state until wanted for use. Near the bottom of this chamber C, throughout its whole length horizontally, or parallel with the seat, I fit two bars or boards, with suitably inclined surfaces, one a little above the other, as shown at $a$ and $b$, Figs. 1 and 3, (where a piece is removed;) and directly under the space or opening between the two bars or boards $a$ and $b$, I place a revoluble shaft, with spurs or points in its periphery or convex surface, all as shown at $c$, Figs. 1 and 3; and, when necessary, this shaft $c$ may be revolved by a crank, as $d$, or otherwise, to pulverize the muck, &c. These two bars $b$ and $a$ and the shaft $c$ form substantially a bottom to support the superincumbent weight of the muck, &c., as but little of it will fall through, except while the shaft $c$ is being revolved.

I construct the vault or substructure F F of stone or any other suitable material, with waterproof cement, in such a manner as to render it perfectly water-tight, and some two or three feet deep.

On the back or outer portion of the vault I erect or construct one or more suitable openings, as shown at G', Fig. 1, where the cap or cover is removed, as indicated at G, Figs. 1, 2, and 3, and I make the back side slanting or inclined, as shown in section at $g$, Fig. 3; and I make these openings into the vault through projections of the wall, formed outward, so as to form these openings inclined or beveled on the sides inward, as well as the back downward, to the bottom of the vault; and I also extend these openings upward into the superstructure, as shown at G', to render the removal of the night-soil, &c., the most convenient at all times, and I cover or secure these openings with water-tight covers or shutters, as shown at G, Figs. 1 and 2, and one of these covers is shown detached in Fig. 5. I render the fitting of these covers water-tight and secure them in their proper positions by beveled cleats, as shown at h, Fig. 3, and indicated at h and h', Figs. 1 and 2, where h' shows the movable or swinging cleat, which may be secured by a screw, k, or otherwise.

Having constructed the vault and house, with their appendages, as before described, and placed the house over the vault, as shown in Figs. 1 and 2, and in section in Fig. 3, I shovel the muck or other disinfectant into the aperture at E, Fig. 1, so as to fill the chamber or reservoir C to any convenient or desired extent, and put on the cover or shutter, Fig. 4, when it will appear as represented at E, Fig. 2, and will be shut water-tight, as indicated in section at E, Fig. 3, so that the muck, &c., will be preserved perfectly dry. I then turn the crank d in the direction indicated by the dart, and cause a suitable quantity of the muck, in a pulverized state, to fall to the bottom of the vault, when the privy will be ready for use, and afterward, as often as is deemed necessary, I (by the same means) let down more of the pulverized muck, &c., so as to keep the night-soil, &c., from exhaling any unpleasant odor, as the muck, &c., will absorb all of the moisture and completely deodorize the whole mass.

When I desire to remove the night-soil, &c., from the vault I open one or more of the apertures by removing the cover at G, Fig. 5, as shown at G', Fig. 1, when, from the flaring, inclined, or beveled sides of the aperture, the contents may be easily and readily scraped out and removed for use as a fertilizer. This rear chamber or reservoir, C, with its appendages, may be readily attached to a privy already constructed, or it may be constructed separately and be connected with the vault without depending on the superstructure of the privy for its support, if it only serves as a reservoir for the muck, &c., and as the means of furnishing the muck to the vault in a pulverized state when needed; and any water-tight vault may be altered by the addition of the projecting parts, with their apertures and covers, when made and fitted substantially as hereinbefore described.

The advantages of my improvement consist in that the privy may thus be kept free from the exhalation of any offensive effluvia for any length of time, and in that the contents of the vault may be removed at any season of the year or any hour of the day without being offensive or unpleasant to any one, and in that the contents of the vault may be used as a fertilizer in any place where desired without offense.

What I claim as my invention, and desire to secure by Letters Patent, is—

1. The combination of the chamber or reservoir C, whether attached to the superstructure of the privy or not, with the vault F, when they are so constructed and combined as to produce by the use of muck the deodorization of the night-soil, &c., substantially as herein described.

2. The combination of the two bars or boards a and b with the toothed or spurred shaft c, when they are so constructed and arranged as to support, pulverize, and deposit the muck, &c., substantially as herein described.

3. The combination of the toothed or spurred shaft c with the chamber C and vault F, when constructed, arranged, and fitted for use substantially as herein described and set forth.

ELIZUR E. CLARKE.

Witnesses:
FREDK. W. J. SIZER,
R. FITZGERALD.